United States Patent
Fukuda

(10) Patent No.: US 7,149,363 B2
(45) Date of Patent: Dec. 12, 2006

(54) IMAGE PROCESSING METHOD, APPARATUS THEREFOR AND STORING MEDIUM

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 09/977,318

(22) Filed: Oct. 16, 2001

(65) Prior Publication Data
US 2002/0071609 A1    Jun. 13, 2002

(30) Foreign Application Priority Data
Oct. 20, 2000    (JP)    ............... 2000-321492

(51) Int. Cl.
G06K 9/46    (2006.01)
G06K 9/36    (2006.01)

(52) U.S. Cl. ........................................ 382/250; 382/166
(58) Field of Classification Search ................ 382/166, 382/232, 250; 348/220.1; 345/605
See application file for complete search history.

(56) References Cited

U.S. PATENT DOCUMENTS 5,822,003 A * 10/1998 Girod et al. ........... 375/240.12
6,665,090 B1 * 12/2003 Hall et al. ................. 358/1.18
2002/0024602 A1 * 2/2002 Juen ........................... 348/220

FOREIGN PATENT DOCUMENTS

| JP | 6-333046 | 12/1994 |
| JP | 7-78256 | 3/1995 |
| JP | 11-212993 | 8/1999 |
| JP | 2002-133414 | 5/2002 |

* cited by examiner

Primary Examiner—Vikkram Bali
Assistant Examiner—Colin LaRose
(74) Attorney, Agent, or Firm—Fitzpatrick, Cella, Harper & Scinto

(57) ABSTRACT

The present invention permits to determine an image characteristic amount for efficiently searching an image without affecting a bad influence upon searching accuracy. First image characteristic amount data is extracted. Second image characteristic amount data is extracted. Then, a distance between two image characteristic amount data is calculated. Further, the calculated distance is compared with a threshold value. If the distance is smaller than the threshold value, the image characteristic amount data having smaller number of coefficients which is advantageous because of smaller data amount is selected, and, if otherwise, the image characteristic amount data having greater number of coefficients is selected.

5 Claims, 8 Drawing Sheets

IMAGE PROCESSING METHOD, APPARATUS THEREFOR AND STORING MEDIUM

BACKGROUND OF THE INVENTION

1. Field of the Invention

The present invention relates to an image processing method capable of processing an image, and an apparatus therefor.

2. Description of the Related Art

It is known to provide a system in which an image is scaled, and a resulting scaled image is subjected to known discrete cosine transform (DCT) processing and quantization processing to obtain plural coefficients from which several coefficients are picked up from low frequency component side, and the picked-up coefficients is regarded as a characteristic amount for an original image and is used as data for searching the image (refer to ISO/IEC JTC1/SC29/WG11/N3522 "MPEG-7 Visual Working Draft 4.0" ([VWD 4.0]) or ISO/IEC JTC1/SC29/WG11/N3522 "MPEG-7 Visual part of experimentation Model Version 7.0" ([VXM 7.0]).

FIG. 1 is a view showing characteristic data extracting processing in Color Layout descriptor described in the above document [VWD 4.0] or [VXM 7.0]. Further, FIG. 8 is a flow chart showing such processing.

An original image 10001 is scaled down into 8×8 pixels (step S10401), and each pixel of resulting 8×8 pixel images (10011, 10012, 10013) is converted into Y/Cb/Cr color space data (10021, 10022, 10023) (step S10402). Then, Y, Cb and Cr data components 10021, 10022, 10023 are subjected to DCT processing (step 10403) to obtain DCT coefficients 10031, 10032, 10033, and the coefficients 10031, 10032, 10033 are subjected to quantization processing (step S10404).

The image scaling processing, color conversion processing and DCT conversion processing may be well-known ones.

For example, according to [VWD 4.0], the quantization processing can be realized by processing shown in the following program codes 10000–10003. The program codes 10000–10003 are described by using well-known C language. According to the above document, in the quantization processing, since different processing operations are effected for a DC component and an AC component with respect to Y component and Cb/Cr components, the above document presents four program codes 10000–10003 for the quantization processing. Program code 10000: Quantization processing for DC component of Y coefficient

```
Int quant_Y_DC(int i)
    int j;
    i=i/8;
    if(i>192)j= 1 1 2+(i·192)/4;
    else if(i>160)j=96+(i·160)/2;
    else if(i>96)j=32+i·96;
    else if(i>64)j=16+(i·64)/2;
    else j=i/4;
    return j>>1;
}
```

Program code 10001: Quantization processing for DC component of Cb/Cr coefficients

```
Int quant_CbCr_DC(int i)
    int j;
    i=i/8;
    if(i>191)j=63;
    else if(i>160)j=56+(i·160)/4;
        else if(i>144)j=48+(i·144)/2;
        else if(i>112)j=16+ I ·112;
        else if(i>96)j=8+(i·96)/2;
        else if(i>64)j=(i·64)/4;
        else j=i/0;
```

Program code 10002: Quantization processing for AC component of Y coefficient

```
Int quant_Y_AC(int i) {
    int j;
    i=i/2;
    if(i>255)I=255;
    if(i<·256)I=·256;
    if(abs(i)>127)j=64+abs(i)/4;
    else if(abs(i)>63)j=32+abs(i)/2;
    else j=abs(i);
    j=(i<0)?·j:j;
    return(int)trunc(((double)j+128.0)/8.0+0.5);
}
```

Program code 10003: Quantization processing for AC component of Cb/Cr coefficients

```
Int quant_CbCr_AC(int i){
    int j;
    if(i>255)I=255;
    if(i<·256)i=·256;
    if(abs(i)>127)j=64+abs(i)/4;
    else if(abs(i)>63)j=32+abs(i)/2;
    else j=abs(i);
    j=(i<0)?·j:j;
    return(int)trunc(((double)j+128.0)/8.0+0.5);
}
```

As a result of the quantization processing using the program codes 10000 and 10001, the quantization-processed DCT coefficients (refer to as "quantization DCT coefficients" hereinafter) of Y or Cb/Cr components have values between 0 and 64. Further, as a result of the quantization processing using the program codes 10002 and 10003, the quantization DCT coefficients of Y or Cb/Cr components have values between 0 and 32.

Accordingly, the DC component of the quantization DCT coefficient can be represented by 6 bits (no sign) and the AC component can be represented by 5 bits (no sign).

Further, among the quantization DCT coefficient 10041, 10042, 10043 obtained by the quantization processing, several coefficients are selected from a low frequency component side (step S10405). In case of FIG. 4, as an example, six coefficients are selected regarding the Y component coefficients and three coefficients are selected regarding each of the Cb/Cr component coefficients. The selection of the coefficients is actually realized by re-placing coefficients arranged 8×8 two-dimensional pattern into coefficients arranged in a one-dimensional pattern by means of a zigzag scan shown in FIG. 1 and selecting several leading coefficients from the one-dimensional pattern. The reference numeral 10101 in FIG. 5 shows the zigzag scan. Numbers from 1 to 64 written in blocks of the scan 10101 represent orders (from a leading order (1)) of the related coefficients after they were re-placed into the one-dimensional pattern.

Lastly, several coefficients are picked up from a low frequency component side. According to [VWD 4.0], the number of coefficients picked up here is 1, 3, 6, 10, 15, 21, 28 or 64. Further, although the number of the Cb component coefficients is the same as that of the Cr component coefficients, the number of the Y component coefficients may be differentiated from the number of the Cb/Cr component coefficients. According to [VWD 4.0], regarding default, six Y component coefficients and three Cb/Cr component coefficients are selected. In FIG. 4, as an example, six Y component coefficients (10051) and three Cb/Cr component coefficients (10052, 10053) are selected as coefficients in the default.

The selected coefficients 10051, 10052, 10053 are used as characteristic data of the original image 10001, i.e., Color Layout descriptor data.

Further, according to [VWD 4.0], the Color Layout descriptor is stored in a form of a binary structure as shown in FIG. 6 or FIG. 7. In the structure 10201 of FIG. 6 and the structure 10301 of FIG. 7, each square block represents one bit. Further, in the structures 10201, 10301, although items are written in partition from field to field for the convenience of explanation, actually, the items are continuously stored in an order as shown by the broken lines in FIG. 6 and FIG. 7.

FIG. 6 is a view showing the binary structure when Color Layout descriptor is default, i.e., when the number of Y quantization DCT coefficients is six and the number of Cb/Cr quantization DCT coefficients is three. In this case, "0" is stored in a leading extension flag. Following to this, six Y quantization DCT coefficients, three Cb quantization DCT coefficients and three Cr quantization DCT coefficients are stored in order. As mentioned above, as a result of quantization, regarding the quantization DCT coefficient, since the DC component can be represented by 6 bits (no sign) and the AC component can be represented by 5 bits (no sign), the DC component is stored in a 6-bits area and the AC component is stored in a 5-bits area.

On the other hand, FIG. 7 is a view showing the binary structure when Color Layout descriptor is not default. In this case, "1" is stored in a leading extension flag. This is followed by two 3-bits areas. These 3-bits areas are used for representing the number of Y quantization DCT coefficients and the number of Cb/Cr quantization DCT coefficients, respectively.

TABLE 10001

Bit pattern for coefficient designating field and meaning thereof

| Bit pattern | Number of quantization DCT coefficients |
|---|---|
| 000 | 1 |
| 001 | 3 |
| 010 | 6 |
| 011 | 10 |
| 100 | 15 |
| 101 | 21 |
| 110 | 28 |
| 111 | 64 |

Following to these two 3-bits coefficient designating fields, Y, Cb and Cr quantization DCT coefficients are stored in order. The numbers of the Y, CB and Cr coefficients are the numbers of coefficients designated by the above-mentioned coefficient designating fields. In 10301 of FIG. 7, as an example, the number of Y quantization DCT coefficients is six and the number of Cb/Cr quantization DCT coefficients is six.

Further, according to [VXM 7.0], similarity between the characteristic data is calculated the following equation. For example, similarity D between two Color Layout descriptors, i.e., CLD1 (Y Coeff, Cb Coeff, Cr Coeff) and CLD2 (Y Coeff', Cb Coeff', Cr Coeff') calculated by the following equation 10001:

[6]

$$D = \sqrt{\sum_{i=0}^{\text{Max}\{NumberOfYCoeff\}-1} \lambda_{Yi}(YCoeff[i] - YCoeff'[i])^2} +$$

$$\sqrt{\sum_{i=0}^{\text{Max}\{NumberOfYCCoeff\}-1} \lambda_{Cbi}(CbCoeff[i] - CbCoeff'[i])^2} +$$

$$\sqrt{\sum_{i=0}^{\text{Max}\{NumberOfYCCoeff\}-1} \lambda_{Cri}(CrCoeff[i] - CrCoeff'[i])^2}$$

In the above equation 10001 for calculating Color Layout descriptor, $\lambda$ is weighting regarding the respective coefficients, and, in [VXM 7.0], weighting values shown in the following Table 10002 are described:

TABLE 10002

| | Weighting values in equation 10001 | | | | | |
|---|---|---|---|---|---|---|
| | Order of coefficient | | | | | |
| | 1 | 2 | 3 | 4 | 5 | 6 |
| Y | 2 | 2 | 2 | 1 | 1 | 1 |
| Cb | 2 | 1 | 1 | | | |
| Cr | 4 | 2 | 2 | | | |

Further, if the numbers of coefficients included in two descriptors are different, the equation 10001 is applied to the fewer number, or value "16" is supplemented to the deficient number and the equation 10001 is applied to the higher number.

Regarding the selection of the numbers of quantization DCT coefficients included in Color Layout descriptor, in case of default, six is selected for Y and three is selected for Cb/Cr. Normally, it was required that such a coefficient selecting method is uniformly determined in a system by predetermining it by the system or is designated by the user case by case.

However, the default coefficient selecting method is not always all-around and is not sufficient to represent characteristics of all of images. If insufficient, searching accuracy of the entire searching system will be subjected to a bad influence.

On the other hand, to avoid this, it is considered that selection of coefficients is effected to obtain more coefficient data or all coefficient data are held. In this case, however, a characteristic amount data size naturally becomes bulky. This may lead to an undesirable case in which the number of images to be treated increased greatly or data capacity is severely limited by a storing area or a communication path.

Accordingly, in order to efficiently utilize Color Layout descriptor without affecting a bad influence upon the searching accuracy, the number of quantization DCT coefficients held for each image must be determined suitably.

SUMMARY OF THE INVENTION

According to an embodiment of the present invention, there is provided an image processing apparatus comprising first extracting means for extracting a first image characteristic amount from an image, second extracting means for extracting a second image characteristic amount from the image, judging means for judging similarity between the first image characteristic amount extracted by the first extracting means and the second image characteristic amount extracted by the second extracting means, and selecting means for selecting either the first image characteristic amount or the second image characteristic amount as a characteristic amount of the image in accordance with a judging result of the judging means.

DETAILED DESCRIPTION OF THE PREFERRED EMBODIMENTS

The present invention will now be explained in connection with embodiments thereof with reference to the accompanying drawings.

<First Embodiment>

Figure 9:
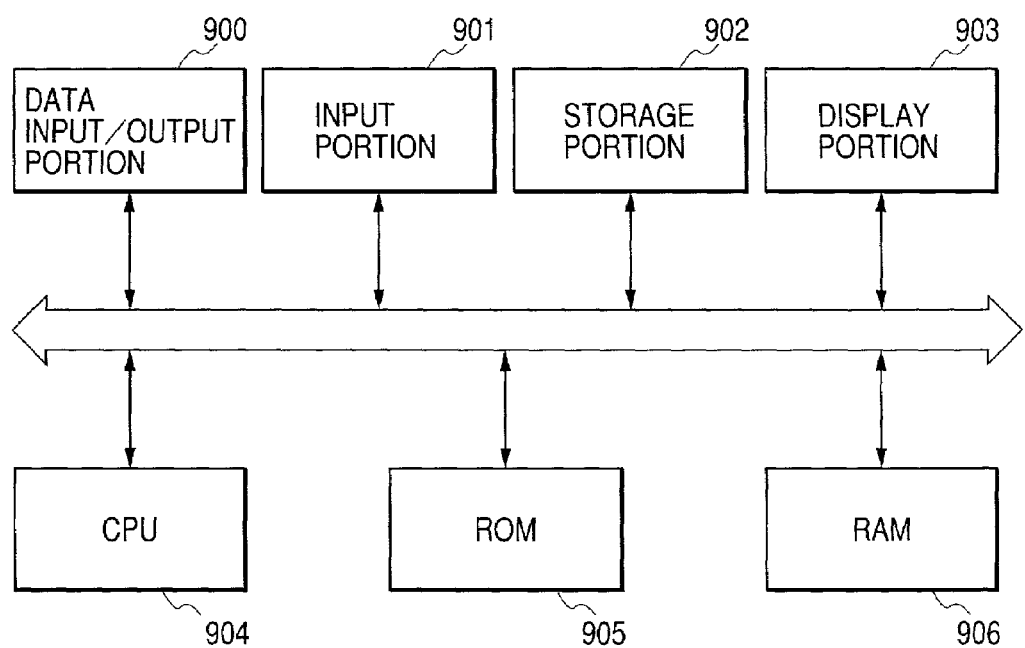
FIG. 9 is a block diagram showing a construction of an image processing apparatus according to the present invention.

FIG. 9 is a block diagram showing a construction of an image processing apparatus capable of effecting image characteristic amount extraction processing according to a first embodiment of the present invention.

In FIG. 9, a data input/output portion 900 is an image inputting device capable of inputting both still image data and moving image data. More specifically, such a portion is a digital video device capable of effecting still image sensing. Further, data such as an image photo-taken by a digital camera can be read-in from a memory card or a PC card through USB. Conversely, data such as an image can be written in the memory card.

An input portion 901 is a device for inputting instruction from the user or data and includes a keyboard and a pointing device. Incidentally, the pointing device may be a mouse, a track ball or a tablet. A concrete example of the input portion 901 may include mode setting means for setting an image input mode or an image sensing mode.

A storage portion 902 is a device for storing image data or image characteristic amount data, and, normally, a hard disk and the like is used. A display portion 903 is a device for displaying an image such as GUI, generally, CRT or a liquid crystal display and the like is used.

Figure 3:
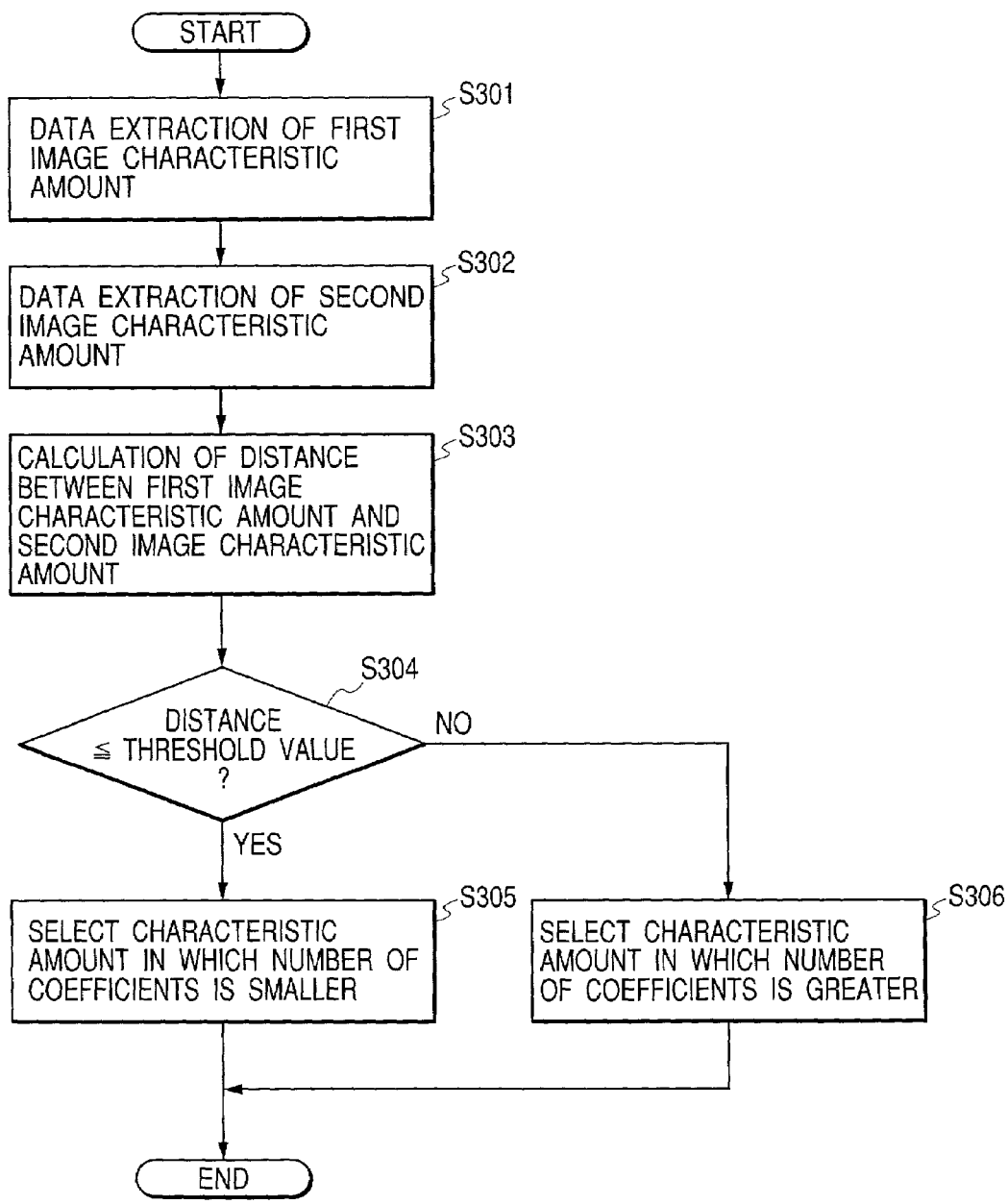
FIG. 3 is a flow chart showing coefficient selection judgement processing.
Figure 8:
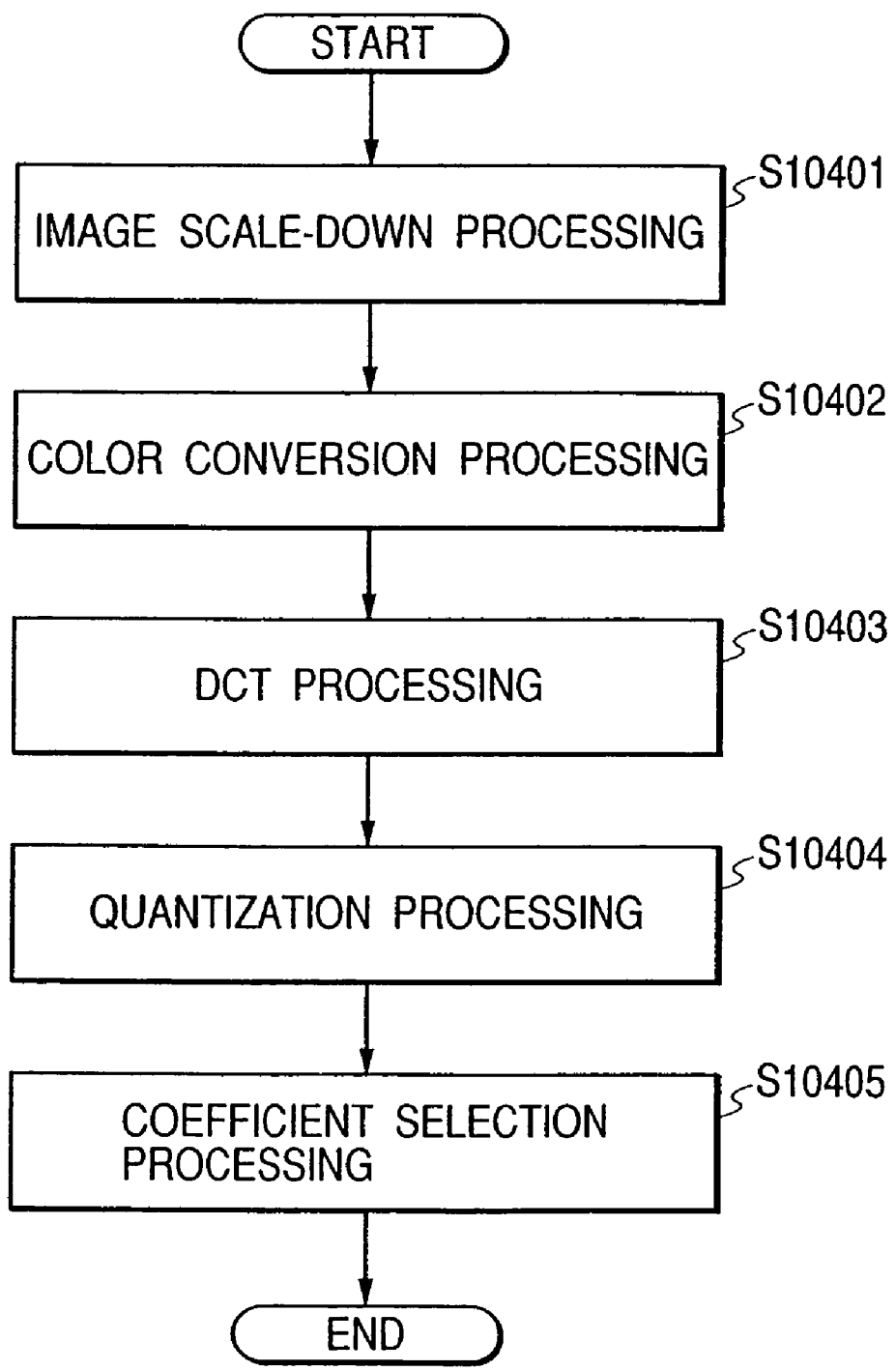
FIG. 8 is a flow chart showing the characteristic extraction processing for Color Layout descriptor.

A CPU 904 is associated with all of processing operations. A ROM 905 and a RAM 906 serve to provide programs required for the processing operations, data and a working area to the CPU 904. Further, control programs required for processing operation shown in flow charts of FIGS. 3 and 8 are stored in the storage portion 902 or in the ROM 905. Incidentally, when the control program is stored in the storage portion 902, after the program is read-in in the RAM 906 once, the program is executed. Incidentally, regarding the construction of the system, although there are various constructions other than the above-mentioned one, since the construction of the system does not form a subject matter of the present invention, explanation thereof will be omitted.

Now, an image characteristic amount extracting system using the above-mentioned image processing apparatus will be explained with reference to the accompanying drawings.

Figure 4:
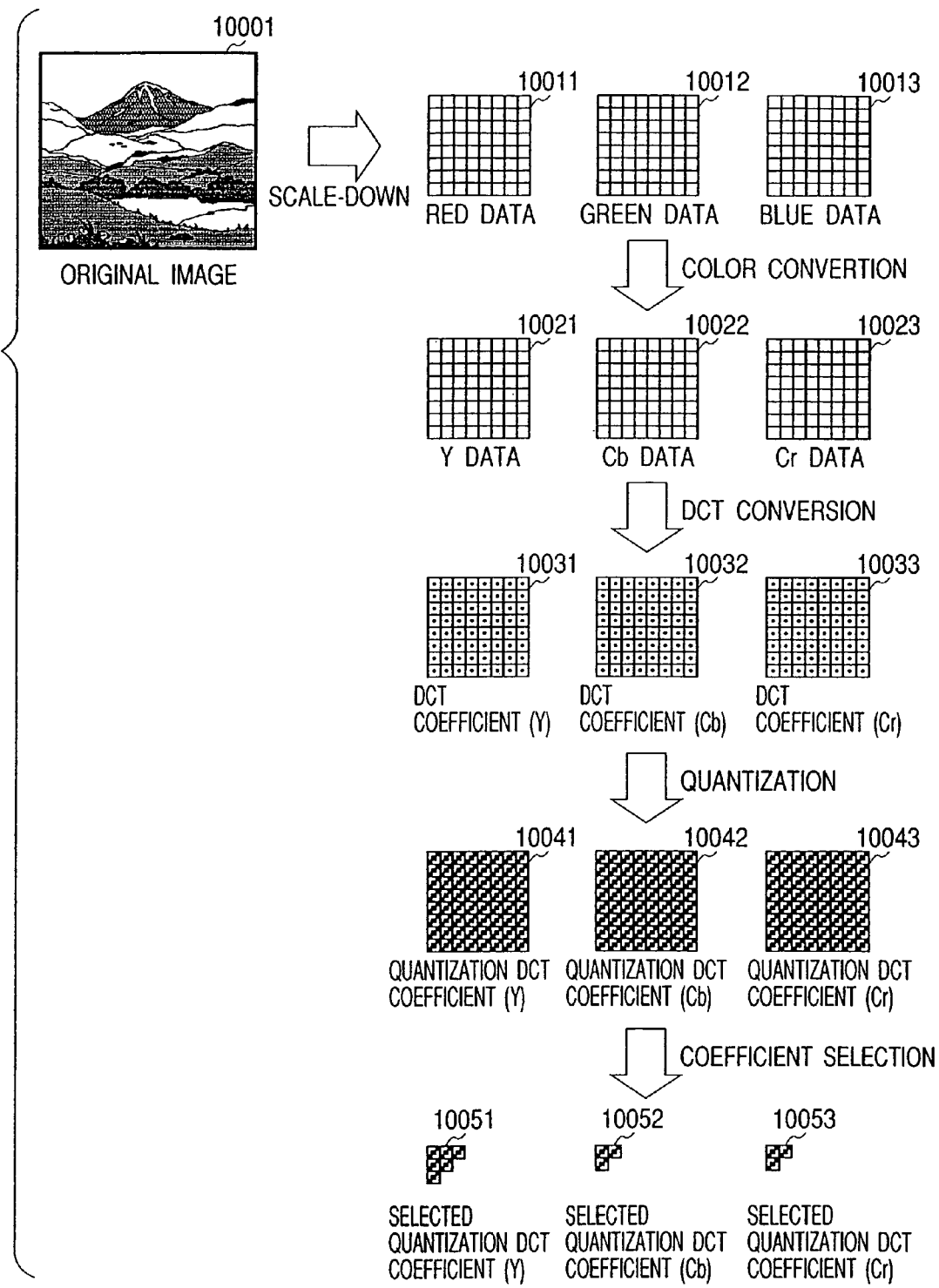
FIG. 4 is a view showing characteristic extraction processing for Color Layout descriptor.
Figure 5:
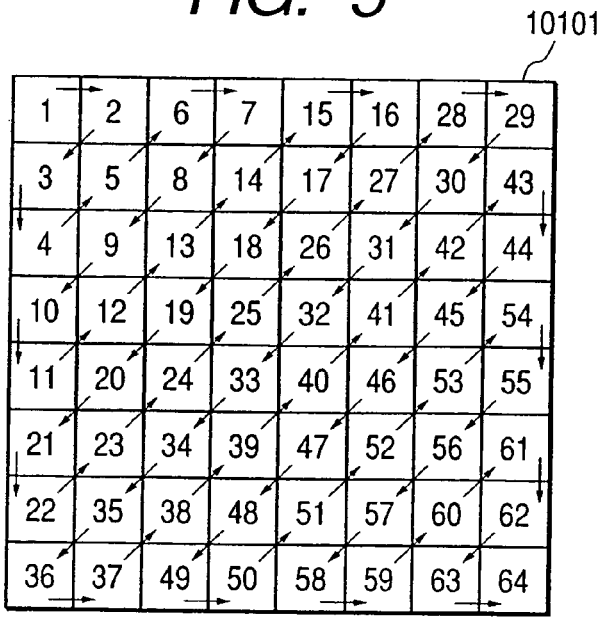
FIG. 5 is a view showing zigzag scanning processing.
Figure 6:
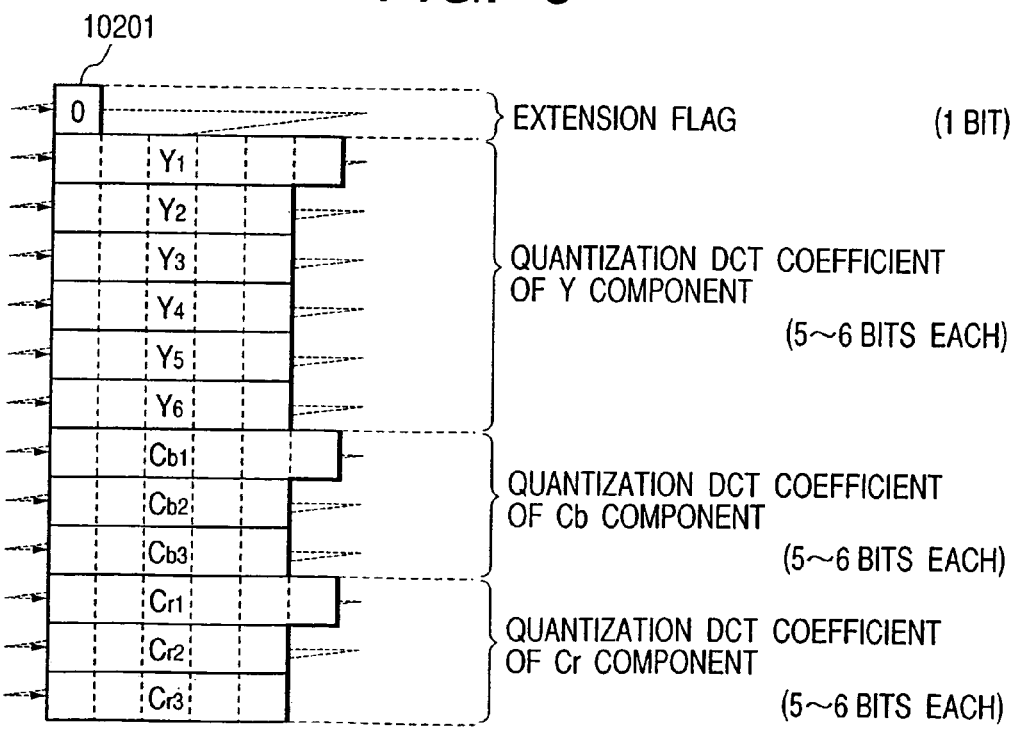
FIG. 6 is a view showing a binary storing system (in default) for Color Layout descriptor.
Figure 7:
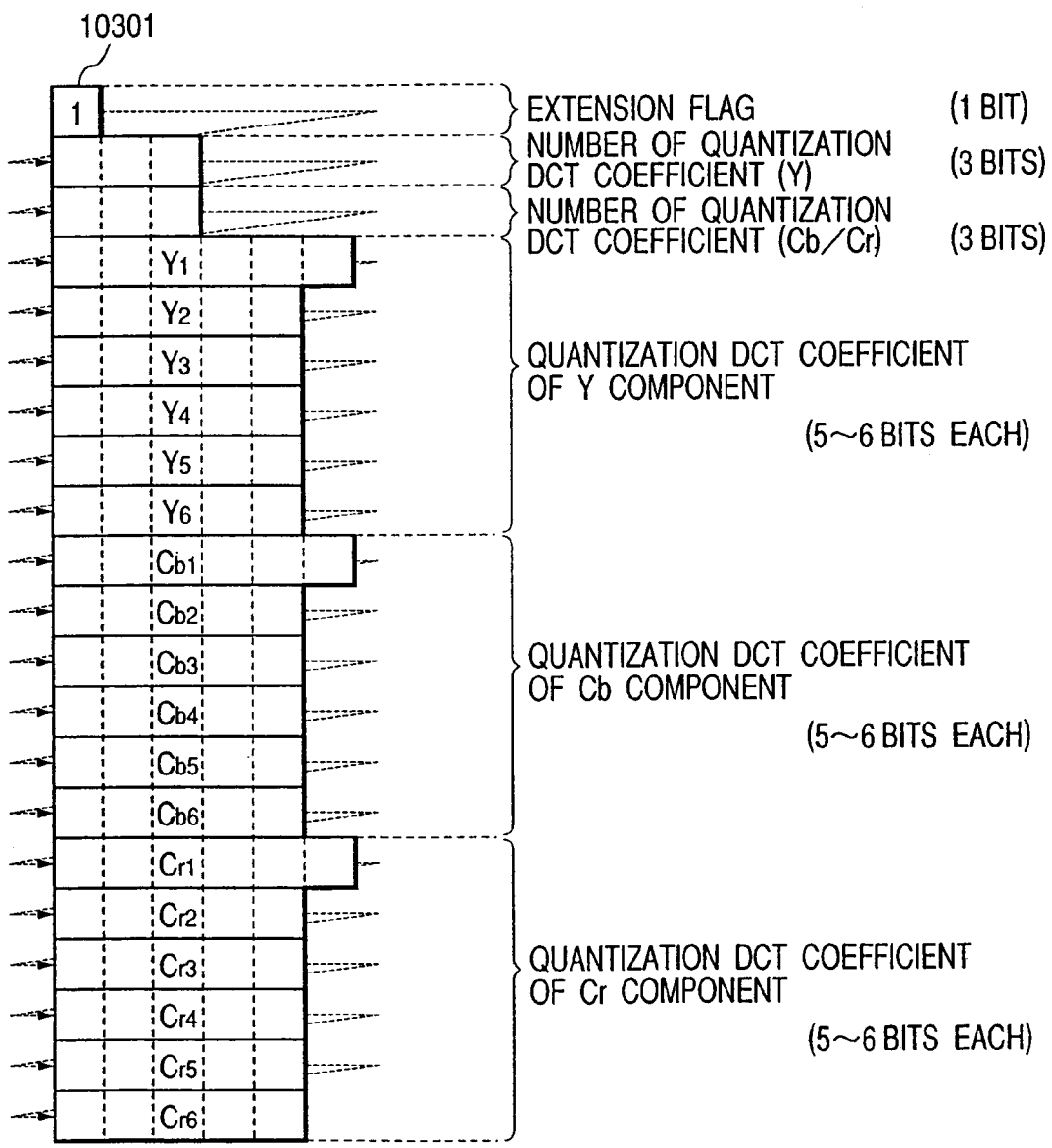
FIG. 7 is a view showing a binary storing system for Color Layout descriptor.

First of all, since general flow of image characteristic amount extraction of Color Layout descriptor is the same as the prior art and is as shown in FIGS. 4, 5 and 6, explanation thereof will be omitted here.

In the prior art, although Y, Cb, Cr data were obtained by effecting color conversion after the original image was scaled down, in the present invention, it is sufficient to have Y, Cb, Cr data for 8×8 pixels as input for DCT processing, and, for example, the present invention also includes the fact that the entire original image is subjected to color conversion, and, thereafter, Y, Cb, Cr data for 8×8 pixels are obtained by a conventional image scaling system. Furthermore, when the original image is image data of Y/Cb/Cr type, color conversion is complicated, and the present invention can be carried out even if the color conversion is omitted.

Hereinbelow, for simplicity's sake of explanation, it is assumed that Color Layout descriptor for holding x (in number) quantization DCT for a Y component, y (in number) quantization DCT for a Cb component and z (in number) quantization DCT for a Cr component is referred to as x/y/z descriptor.

Now, it is considered to form Color Layout descriptor for a certain image. For example, as shown in FIG. 1, two coefficient selecting systems of 6/3/3 and 6/6/6 type are prepared, and one of them is selected.

Figure 1:
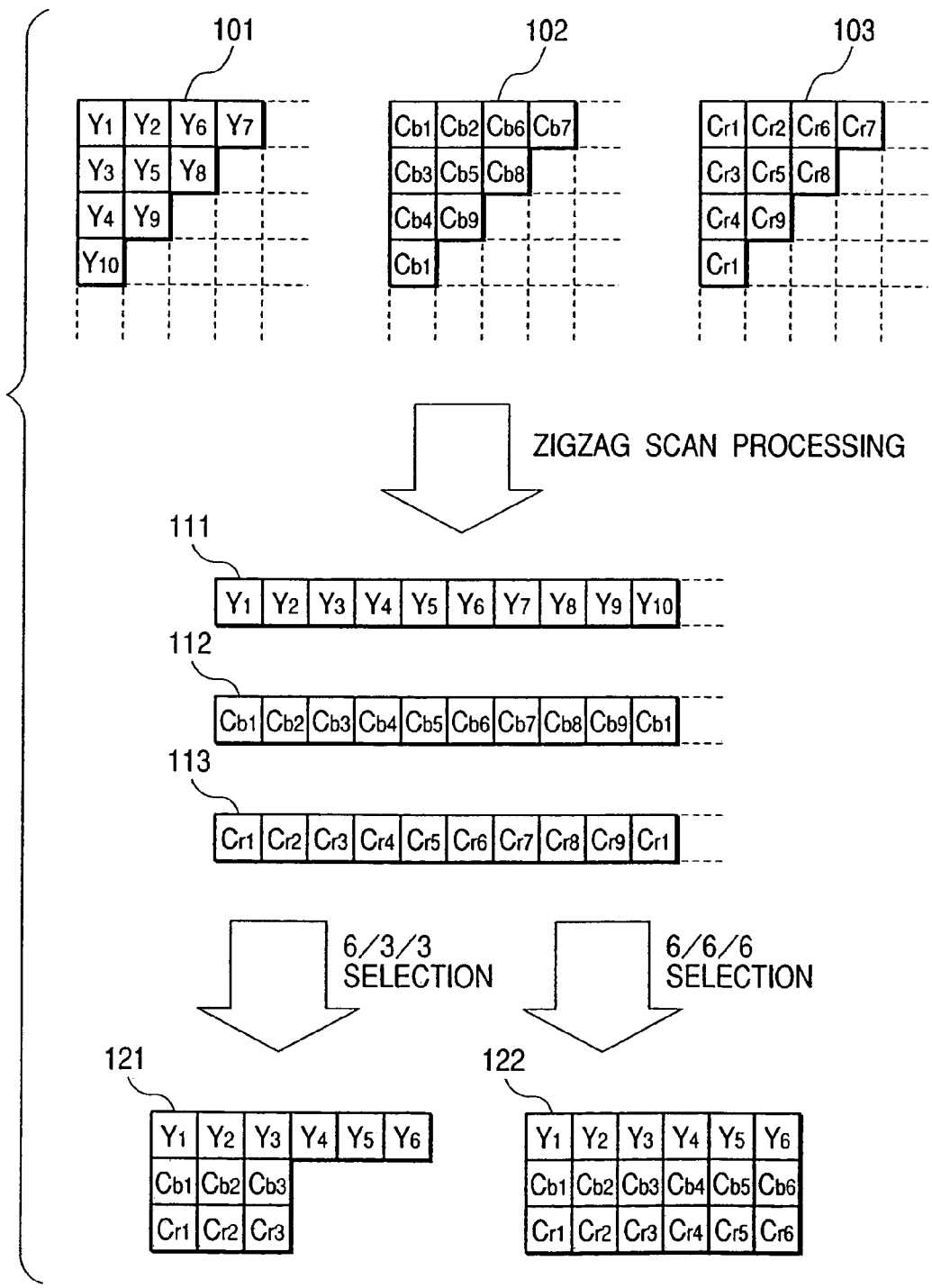
FIG. 1 is a view showing characteristic data extraction processing.

FIG. 1 is a view showing coefficient selection for the image characteristic amount data of a certain image. In FIG. 1, the reference numeral 101 denotes (a part of) quantization DCT coefficient of a Y component; 102 denotes (a part of) quantization DCT coefficient of a Cb component; and 103 denotes (a part of) quantization DCT coefficient of a Cr component. A method for obtaining quantization DCT coefficients regarding 101 to 103 is shown in FIG. 4.

As shown in 111–113 of FIG. 1, these coefficients are arranged in a one-dimensional pattern by zigzag scanning processing as shown in FIG. 5.

Then, the coefficient selection is effected on the basis of the quantization DCT coefficients arranged in the one-dimensional pattern. Here, for example, when the selection is effected by using 6/3/3 type, a set of coefficients 121 shown in FIG. 1 are extracted. Alternatively, when the selection is effected by using 6/6/6 type, a set of coefficients 122 shown in FIG. 1 are extracted.

If the characteristic represented by the set 121 of quantization coefficients is well similar to the characteristic represented by the set 122 of quantization coefficients, the set 121 of quantization coefficients is advantageous since the data amount is smaller. Conversely, if the characters are not so similar to each other, the set 121 of quantization coefficients may have possibility of deficiency of a part of characteristic of the original image. Accordingly, the selection is effected on the basis of a certain reference or standard.

To effect the selection, in the illustrated embodiment, a distance between the set 121 of quantization coefficients and the set 122 of quantization coefficients is considered. According to [VXM 7.0], in the calculation of distance of descriptor, there is shown a method in which, if the numbers of coefficients of the descriptors to be compared is different, a part of the coefficient of descriptor having greater coefficients is neglected to match it to the descriptor having smaller coefficients or 16 is supplemented to the coefficient portion which is not included in the descriptor having smaller coefficients to match it to the descriptor having greater coefficients.

Figure 2:
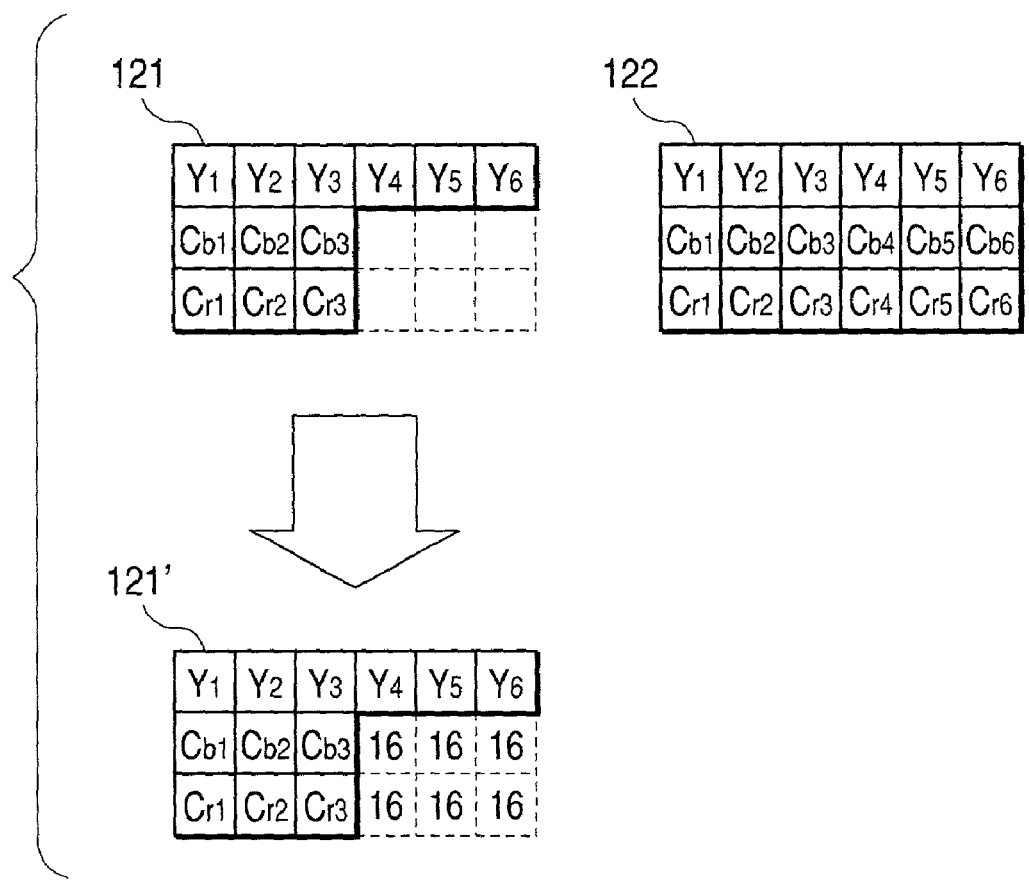
FIG. 2 is a view showing processing in comparison between descriptors having different numbers of coefficients.

In the former case, when the part of coefficients are removed from the set 121, the sets 121, 122 becomes always the same. However, in the latter case, depending upon the values of Cb4–Cb6 and Cr4–Cr6, the sets 121, 122 do not coincide with each other. A set 121' in FIG. 2 represents a set obtained by supplementing 16 to the lacked components of the set 121.

In the illustrated embodiment, a distance between the set 121' and the set 122 is considered. If the distance therebetween is very small, it is considered that the characteristics of the original images represented by these sets are very similar to each other. In such a case, the set 121 (6/3/3) which is advantageous because of smaller data amount is selected. If otherwise, the set 122 is selected.

As distance between the sets 121' and 122, various factors can be considered. In the illustrated embodiment, a total of absolute difference between corresponding coefficients of the set 121', 122 is considered. That is to say, "d" in the following equation is considered:

$$d = \sum_{i=1}^{NumberOfY} |Yi - Y'i| + \sum_{j=1}^{NumberOfCb} |Cbi - Cb'j| + \sum_{k=1}^{NumberOfCr} |Crk - Cr'k|$$

Equation 1: an example (1) for measuring the distance between two descriptors according to the present invention.

Where, in case of the sets 121' and 122,
Yi=Y'i (1≦i≦6)
Cbj=Cb'j (1≦j≦3)
Crk=Cr'k (1≦k≦3)
Cb'j=Cr'k=16 (4≦k≦6)

are satisfied. Here, Y'i, Cb'j and Cr'k represent the coefficients of the set 122, and Yi, Cbj and Crk represent the coefficients of the set 121'. When these values are substituted, the equation (1) becomes as follows:

$$d = \sum_{j=3}^{6} |16 - Cb'j| + \sum_{k=1}^{6} |16 - Cb'k|$$

Equation 2: an example (2) for measuring the distance between two descriptors according to the present invention Then, the value d is compared with a predetermined threshold value Th. If the value d is smaller than the value Th, it is judged that the sets 121' and 122 are sufficiently similar to each other, and the set 121 (i.e., the quantization DCT coefficients of 6/3/3 type) is selected. If otherwise, the set 122 (i.e., the quantization DCT coefficients of 6/6/6 type) is selected. The threshold value may be any positive value. Further, the threshold value may be dynamically determined under a certain condition or may be previously determined by an experiential method.

In the illustrated embodiment, while an example that the total of the absolute difference between the corresponding coefficients is used for judging the distance between two descriptors was explained, the distance may be defined in another way. For example, the distance may be defined in accordance with the above-mentioned [VXM 7.0]. Further, while the judgement was effected by using the single equation, for example, the judgement processing regarding Y, Cb and Cr color components may be effected and the judgement may be effected in accordance with "and" condition and "or" condition thereof.

In the illustrated embodiment, while an example that 6/6/6 type and 6/3/3 type are prepared as candidates of the numbers of quantization DCT coefficients was explained, other types or patterns may be used.

FIG. 3 is a flow chart showing the coefficient selection judgement processing.

First of all, in a step S301, the first image characteristic amount data is extracted. In the illustrated embodiment, this corresponds to the extraction processing for extracting the set 121, for example. Then, in a step S302, the second image characteristic amount data is extracted. In the illustrated embodiment, this corresponds to the extraction processing for extracting the set 122, for example.

Then, in a step S303, the distance between two image characteristic amount data is calculated. That is to say, in the illustrated embodiment, the set 121' is formed from the set 121 of quantization DCT coefficients and the distance d between the sets 121' and 122 is calculated on the basis of the equation 1 or equation 2, for example.

Further, the calculated distance d is compared with the threshold value in a step S304. If the distance d is smaller than the threshold value, the image characteristic amount data which is advantageous because of smaller number of coefficients is selected (step S305). If otherwise, the image characteristic amount data having greater number of coefficients is selected.

Then, Color Layout descriptor is formed by using the selected quantization DCT coefficients.

<Second Embodiment>

In the first embodiment, while an example that the number of quantization DCT coefficients is determined in accordance with the value of the descriptor data was explained, such number may be altered in accordance with an image sensing condition.

For example, experientially, it was found that moving image data has a relatively small dynamic range and can be well represented by 6/3/3 type. On the other hand, it was found that many of the still images are high fine images and frequently cannot be well represented unless 6/6/6 type is used.

Thus, in a second embodiment of the present invention, in the selection between 6/3/3 type and 6/6/6 type is determined in accordance with the image sensing condition of the original image. That is to say, when the original image is the moving image, quantization DCT coefficients of 6/3/3 type are selected; and when the original image is the still image, quantization DCT coefficients of 6/6/6 type are selected.

The judgement whether the original image is the moving image or the still image may be effected on the basis of MIME TYPE of the original image data, a file name or an extension element, and for example, when the present invention is applied to a conventional digital video device capable of image sensing both the moving image and the still image, such judgement may be effected on the basis of an image sensing mode (designated by the user through a dial, for example).

Incidentally, the present invention may be applied to a system constituted by plural equipments (for example, host computer, interface device, reader, printer and the like) or a device constituted by a single equipment (for example, copying machine, facsimile or the like).

Further, it should be noted that the object of the present invention can be achieved by supplying a storing medium storing a program code of software for executing the functions of the above-mentioned embodiments to the system or the apparatus and by reading out and executing the program code stored in the recording medium by means of a computer (or CPU or MPU) of the system or the apparatus.

In this case, the program code itself read out from the recording medium realizes the functions of the embodiments, and, thus, the storing medium storing such program code constitutes the present invention.

As the storing medium for storing the program code, for example, a floppy disk, a hard disk, an optical disk, a photo-magnetic disk, CD-ROM, CD-R, a magnetic tape, a non-volatile memory card or ROM can be used.

Further, it should be noted that the present invention includes a concept that not only the functions of the above-mentioned embodiments are realized by executing the program code read out by means of the computer, but also OS (operating system) running on the computer executes the actual processing partially or totally on the basis of instruction of the program code to realize the functions of the embodiments.

Further, it should be noted that the present invention includes a concept that, after the program code read out from the storing medium is written in a memory of a function extension board inserted into the computer or a function extension unit connected to the computer, a CPU of the function extension board or of the function extension unit executes the actual processing partially or totally on the basis of instruction of the program code to realize the functions of the embodiments.

As mentioned above, in the image characteristic amount extracting system in which several coefficients are selected and extracted among the quantization DCT coefficients obtained by effecting the discrete cosine transform and quantization processing with respect to the image having 8×8 pixels from the low frequency component side and the extracted coefficients are used as the characteristic amount of the original image, the preferable number of coefficients can be selected by altering the number of coefficients to be extracted in accordance with the original image.

The image characteristic amount for efficiently searching the image can be determined without affecting a bad influence upon the searching accuracy.

What is claimed is:

1. An image processing apparatus comprising:
    extracting moans for extracting a first image characteristic amount and a second image characteristic amount from an image, the second image characteristic amount being larger than the first image characteristic amount;
    judging means for judging a similarity between the first image characteristic amount and the second image characteristic amount extracted by said extracting means; and
    selecting means for selecting either the first image characteristic amount or the second image characteristic amount as a characteristic amount of the image in accordance with a judging result of said judging means,
    wherein the first image characteristic amount and the second image characteristic amount are obtained by scaling the image and by effecting DCT processing and quantization processing on the scaled image and by extracting several coefficients among coefficients obtained by a processing result from a low frequency component side.

2. An image processing apparatus according to claim 1, wherein, if said judging means judges that the first image characteristic amount and the second image characteristic amount are similar to each other, said selecting means selects the first image characteristic amount, and, if said judging means judges that the first image characteristic amount and the second image characteristic amount are not similar to each other, said selecting means selects the second image characteristic amount.

3. An image processing method comprising:
    an extracting step of extracting a first image characteristic amount and a second image characteristic amount from an image, the second image characteristic amount being larger than the first image characteristic amount;
    a judging step of judging a similarity between the first image characteristic amount and the second image characteristic amount extracted in said extracting step; and
    a selecting step of selecting either the first image characteristic amount or the second image characteristic amount as a characteristic amount of the image in accordance with a judging result of said judging step,
    wherein the first image characteristic amount and the second image characteristic amount are obtained by scaling the image and by effecting DCT processing and quantization processing on the scaled image and by extracting several coefficients among coefficients obtained by a processing result from a low frequency component side.

4. An image processing method according to claim 3, wherein if said judging step judges that the first image characteristic amount and the second image characteristic amount are similar to each other, said selecting step selects the first image characteristic amount, and, if said judging step judges that the first image characteristic amount and the second image characteristic amount are not similar to each other, said selecting step selects the second image characteristic amount.

5. A computer-readable storage medium on which is stored a computer-executable program, the program comprising:
    program code for an extracting step of extracting a first image characteristic amount and a second image characteristic amount from an image, the second image characteristic amount being larger than the first image characteristic amount;
    program code for a judging step of judging a similarity between the first image characteristic amount and the second image characteristic amount extracted by said code for an extracting step; and
    program code for a selecting step of selecting either the first image characteristic amount or the second image characteristic amount as a characteristic amount of the image in accordance with a judging result of said code for a judging step, wherein the first image characteristic amount and the second image characteristic amount are obtained by scaling the image and by effecting DCT processing and quantization processing on the scaled image and by extracting several coefficients among coefficients obtained by a processing result from a low frequency component side.

* * * * *

UNITED STATES PATENT AND TRADEMARK OFFICE
CERTIFICATE OF CORRECTION

PATENT NO. : 7,149,363 B2  
APPLICATION NO. : 09/977318  
DATED : December 12, 2006  
INVENTOR(S) : Fukuda Page 1 of 1

It is certified that error appears in the above-identified patent and that said Letters Patent is hereby corrected as shown below:

DRAWING SHEET 4:
FIG. 4, "CONVERTION" should read -- CONVERSION --.

COLUMN 1:
Line 18, "is" should read -- are --; and
Line 19, "is" should read --are--.

COLUMN 2:
Line 63, "arranged" should read -- arranged in an --.

COLUMN 4:
Line 5, "calculated" should read -- calculated by --; and
Line 8, "calculated" should read -- is calculated --.

COLUMN 6:
Line 64, "well" should read -- very --.

COLUMN 7:
Line 18, "121, 122 becomes always" should read -- 121 and 122 always become --.

Signed and Sealed this

Thirteenth Day of November, 2007

JON W. DUDAS  
*Director of the United States Patent and Trademark Office*